United States Patent [19]

Federspiel et al.

[11] Patent Number: 5,207,533
[45] Date of Patent: May 4, 1993

[54] PROCESS AND DEVICE FOR REPLACING AN UNDERGROUND PIPE

[75] Inventors: Eric Federspiel, Saint-Gratien; Richard Godefroy, Bondy, both of France

[73] Assignee: Gaz de France, Paris, France

[21] Appl. No.: 645,207

[22] Filed: Jan. 24, 1991

[30] Foreign Application Priority Data

Feb. 1, 1990 [FR] France .................. 90 01199
Jun. 19, 1990 [FR] France .................. 90 07673

[51] Int. Cl.⁵ .................................. E02D 29/10
[52] U.S. Cl. .......................... 405/156; 405/174; 405/184
[58] Field of Search ............... 405/156, 184, 154, 174

[56] References Cited

U.S. PATENT DOCUMENTS

| | | |
|---|---|---|
| 3,181,302 | 5/1965 | Lindsay . |
| 3,711,076 | 1/1973 | Goetz . |
| 4,134,453 | 1/1979 | Love et al. . |
| 4,723,873 | 2/1988 | Masznyik ............... 405/156 |
| 4,732,222 | 3/1988 | Schmidt ............... 405/156 X |
| 4,767,236 | 8/1988 | Rice ................... 405/156 X |
| 4,787,463 | 11/1988 | Geller et al. ........ 405/184 X |

FOREIGN PATENT DOCUMENTS

| | | |
|---|---|---|
| 0094694 | 11/1981 | European Pat. Off. . |
| 0318153 | 10/1988 | European Pat. Off. . |
| 2213904 | 12/1987 | United Kingdom . |

*Primary Examiner*—Dennis L. Taylor
*Assistant Examiner*—J. Russell McBee
*Attorney, Agent, or Firm*—Notaro & Michalos

[57] ABSTRACT

In order to replace a first underground pipe such as a metal pipe by a second pipe of mean diameter substantially equal to or greater than that of the first pipe, the first pipe is cut longitudinally by a localized projection of a flow of matter, particles or radiation thanks to a localized projection means which are displaced inside the first pipe in order to divide the first pipe longitudinally into at least two segments. Cutting by localized projection avoids in particular the creation of vibrations during fragmentation of the pipe to be replaced.

17 Claims, 5 Drawing Sheets

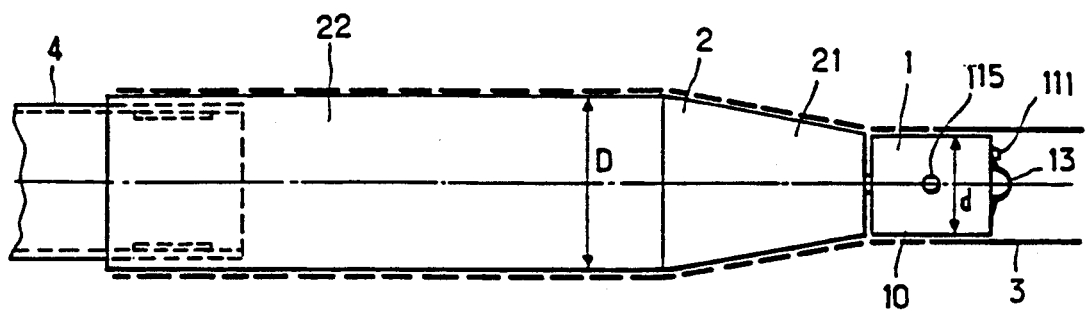
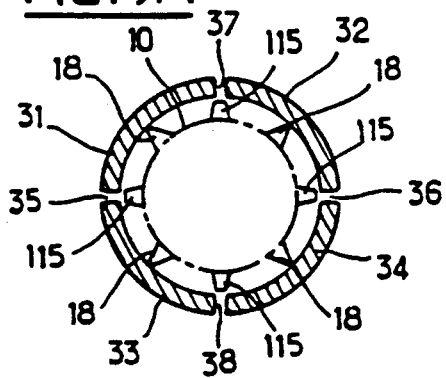 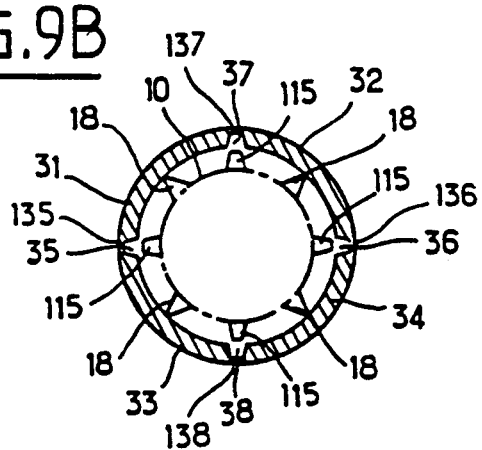
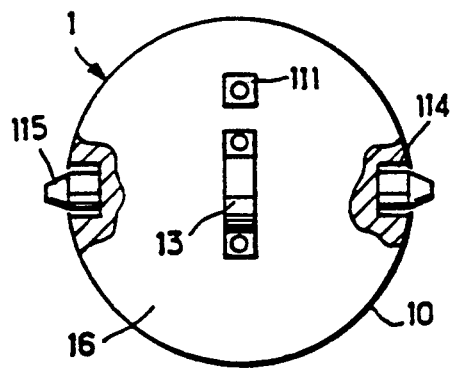 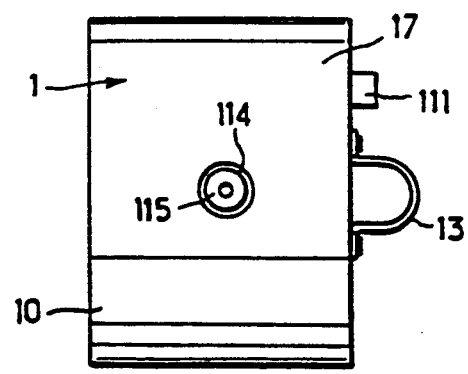

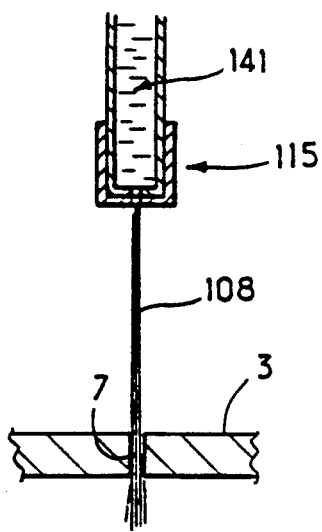
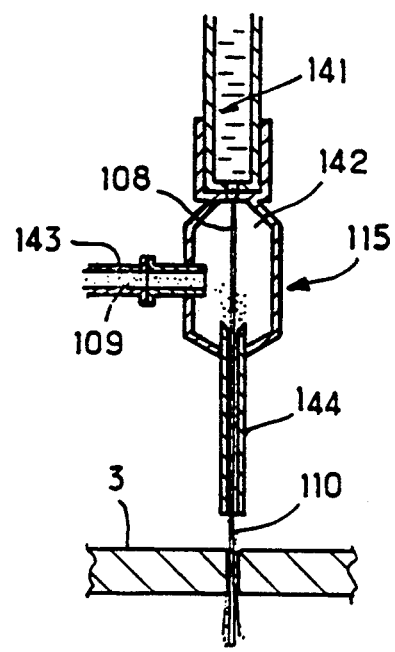

PROCESS AND DEVICE FOR REPLACING AN UNDERGROUND PIPE

FIELD OF THE INVENTION

The present invention relates to a process and device for replacing an existing, underground pipe, particularly a metal pipe, by another pipe of diameter equal to or greater than the existing pipe.

BACKGROUND OF THE INVENTION

It is often necessary to replace existing underground pipes forming part, for example, of drinking water, sewage or gas mains. A pipe has to be replaced for example when an existing pipe is in a poor state of repair or when, further to an increase in the load, the capacity of the existing pipe is no longer sufficient.

A first, and oldest, manner of replacing the pipes consists in effecting a complete excavation, which is expensive and considerably detrimental to the environment, particularly in urban areas, insofar as the roadway and/or pavement of a street must be destroyed.

Another manner of replacing an existing pipe, developed more recently on an industrial scale, consists, in order to avoid excavation, in introducing a new pipe inside the old one. Of course, this means that the new pipe must present an outer diameter smaller than the inner diameter of the old pipe, hence a reduction in the section of passage, which prevents this technique from being employed if the capacity of transport is to be maintained or increased, unless the pressure of the fluid conveyed is modified.

Another manner of replacing a pipe consists in fragmenting the pipe in situ by means of a special tool, in pushing the fragments radially towards the outside, then in introducing a new tube in the space thus created. This technique is described in particular in document EP-A2-0094694 which relates to a process for inserting a new pipe in place of an old one after splitting the latter, and in document EP-B1-0053480 which relates to particular devices for employing the process mentioned above.

In the splitting technique described in the documents cited above, a percussion device acts on the fracturing tool brought into contact with the existing pipe in order to cause fragmentation thereof. Use of a percussion tool provokes vibrations which may disturb the immediate environment of the pipe to be replaced, which constitutes a nuisance particularly when several pipes of different nature lie underground in the vicinity of one another.

Moreover, the splitting technique can only be used where the pipe is sufficiently fragile and made of a material such as grey pig-iron for example, which is easily broken. If, as is generally the case, certain sections of pipe have already been repaired and include different, more resistant and non-brittle materials, such as ductile cast iron or steel, the fracturation tool is blocked on these non-brittle sections which are generally not indicated on the plans. The tool may itself be damaged and in any case it is then necessary to return to a traditional method of excavation to disengage the tool and proceed with the fracturation or removal of the non-brittle section. The fact of interrupting here and there the advance of the fracturation tool and of proceeding with a conventional excavation in the ground, slows down the whole process and thus constitutes a loss of time and money.

Furthermore, the splitting of a pipe into a multiplicity of fragments capable of obstructing the passage makes it necessary to effect the fracturation, spreading of the fragments of the split pipe and positioning of the new pipe, in one single operation. This may present drawbacks if the new pipe to be laid is not immediately available. In fact, in that case, it is not possible to commence destruction of the existing pipe and to effect laying of the new pipe in a second step.

Document U.S. Pat. No. 3,181,302 discloses an apparatus for replacing a substantially horizontal underground pipe. The apparatus comprises a cutting tool constituted by a certain number of cutting discs mounted so as to be able to rotate on a supporting bar, the cutting tool being provided to be towed in the pipe by means of a winch cable with the result that the discs progressively split the pipe into two parts in the longitudinal direction.

The rear end of the cutting tool is connected to a conical device for spreading the two halves of cut pipe apart and a new pipe, connected to the spreader device, is engaged in the space previously occupied by the existing pipe.

This technique employs heavy, sophisticated and expensive equipment and requires a very high-power traction element since it must provoke mechanical cutting with the aid of towed cutting elements, whilst also towing the spreader element and the new pipe. The apparatus therefore often act jerkily, which hinders advance. Furthermore, in the case of brittle materials, mechanical cutting produces fragments which may block the cutting mechanism.

Various industrial metal cutting processes are also known, of which certain, such as oxygen-cutting, plasma cutting, laser cutting, fusion drilling, cutting by torch employing powdered iron, enable the metal to be heated beyond its melting point. Various industrial cutting processes are also known, based on the localized projection of a fluid under pressure, the latter being homogeneous, for example water, or non-homogeneous, for example water containing an abrasive agent such as inorganic particles. However, these various processes have not yet been applied to remote-controlled underground works for replacing underground pipes.

It is an object of the present invention to overcome the drawbacks set forth hereinabove and to effect in situ, continuously and without jerks, the cutting of an underground pipe, without it being necessary to proceed with excavations.

It is a further object of the invention to cut an existing pipe, limiting the risks of blocking the cutting device.

The invention also aims at allowing a new pipe to be laid, whose diameter is substantially equal to or greater than that of the existing pipe, either during an operation combined with that of the cutting of the existing pipe or during a subsequent step distinct from the cutting operation, as desired, and without it being necessary to proceed with the removal of the existing pipe.

It is a further object of the invention to allow a pipe to be replaced with the aid of a device involving only moderate efforts of traction, and to enable the operational parameters of the cutting device to be easily adjusted and if necessary automatically adapted as a function of the characteristics of the existing pipe.

SUMMARY OF THE INVENTION

These objects, and others which will appear from the following description, are attained thanks to a process for replacing a first underground pipe, such as a pipe made of metallic, plastics or inorganic material, by a second pipe whose mean diameter is substantially equal to or greater than that of said first pipe, in which cutting means are displaced inside the first pipe in order to divide said first pipe longitudinally into at least two segments, wherein it consists in cutting said first pipe over at least part of its thickness by the localized action of a flow of particles, matter or radiation on said first pipe, thanks to localized projection means which are displaced inside the first pipe in order to proceed with said longitudinal division of said first pipe into at least two segments.

The process further consists in spreading apart and, if necessary, dividing said cut segments of said first pipe in order to allow introduction of said second pipe intended to replace said first pipe.

The cut segments of the first pipe may be spread apart immediately after the operation of cutting by localized projection, in the course of the same step during which localized projection means and spreader means are made to advance simultaneously inside the first pipe.

However, according to another possible embodiment, cutting of the first pipe by localized projection is effected in the course of a first step during which localized projection means are made to advance inside the first pipe, and the cut segments of said first pipe are spread apart during a subsequent, separate step of laying the second pipe, the spreading of the cut segments being effected with the aid of a spreader means introduced separately in the first pipe after said localized projection means and advancing inside the first cut pipe independently of said localized projection means.

According to a particular embodiment, a protection sleeve is inserted in said first fragmented and spread apart pipe, of which the head is towed behind said spreader means, then said definitive second pipe to be laid is introduced inside said sleeve, in a subsequent step.

However, according to another particular embodiment, said definitive second pipe to be laid, whose head is towed behind said spreader means, is inserted directly in said first fragmented and spread apart pipe.

The invention is applicable to pipes made of various materials, for example metal or metal alloy, plastics or inorganic materials, composite materials, and the localized projection producing cutting of said first pipe may be effected thanks to a fluid under pressure, homogeneous or non-homogeneous, depending on the nature of said first pipe, as well as by the projection of flow of matter, particles or radiation provoking cutting by localized heating under the action of the localized projection of said flow, the process employing a localized heating being particularly adapted for metal pipes.

The localized heating producing cutting of said first pipe may be effected by oxygen-cutting, by a process of cutting by plasma arc, by a process of cutting by laser beam, by a process of fusion drilling, or by a process using a torch employing powdered iron.

The invention also relates to a device for carrying out the process set forth hereinabove, this device comprising cutting means, spreader means and drive means, and being more particularly characterized in that said cutting means comprise an essentially cylindrical head provided on its lateral surface with at least two cutting nozzles of which the free end is oriented towards the inner wall of said first pipe, said nozzles being provided with at least one inner conduit adapted to direct towards the surface be cut a local cutting means constituted by a flow of particles, matter or radiation, at least one connector being provided on a front face of the head to allow connection with at least one means for supplying the local cutting means applied by said nozzles.

The cutting head may comprise at least one fastening element located on the front face of the head to allow towing of said cutting head by said drive means.

The spreader means may comprise an essentially conical or truncated front part and a cylindrical rear extension of diameter D greater than diameter d of the cutting head.

According to a particular embodiment, the device comprises at least a first connector disposed on a front face of the head to allow connection with a fluid supply conduit, and the local cutting fluid directed through the nozzles towards the inner wall of the first pipe is a directional jet of water.

According to another particular embodiment, the device comprises at least a first connector disposed on a front face of the head to allow connection with a fluid supply conduit and the local cutting fluid directed through the nozzles towards the inner wall of the first pipe is a directional jet constituted by a mixture of water and of abrasive particles.

According to another particular embodiment, the device comprises at least a first connector disposed on a front face of the head to allow connection with an electrical supply cable, and the local cutting means directed through the nozzles towards the inner wall of the first pipe is a laser beam.

According to yet another particular embodiment, the device comprises at least a first connector disposed on a front face of the head to allow connection with an electrical supply cable and at least a second connector disposed on a front face of the head to allow connection with a flexible conduit for supplying pressurized air, the inner conduits of said nozzles are connected to said second connector and each nozzle comprises an electrode which is connected to said first connector and of which the end is slightly retracted with respect to the free end of the nozzle, to create with the wall of the first metal pipe an electric arc and produce local heating of the wall and cutting by means of a plasma arc.

According to yet another particular embodiment, the device comprises at least a second connector disposed on a front face of the head to allow connection with a flexible oxygen-supply conduit and at least a third connector disposed on a front face of the head to allow connection with a flexible conduit supplying combustible gas, each of the nozzles comprising at least first and second inner conduits connected respectively to said second and third connectors to conduct the oxygen and combustible gas into a combustion zone located at the free end of said connector to effect cutting of the wall of the first pipe by oxygen-cutting.

In that case, the combustible gas is advantageously acetylene.

In order to effect oxygen-cutting, the two inner conduits of the nozzle are advantageously coaxial, the first being located on the axis of symmetry of the nozzle to ensure admission of the combustible gas such as acetylene and the second conduit surrounding the first to conduct oxygen towards the zone of fusion.

The drive means may be provided to tow at least the cutting head inside the first pipe thanks to a cable fixed on the fastening element provided at the front of the cutting head.

Furthermore, the drive means may comprise a thrust device acting at least on the cutting head inside said first pipe.

In order to increase the cutting speed, the drive means may comprise both traction means and thrust means acting at least on said cutting head inside the first pipe.

The cutting head may be provided with more than two nozzles and may comprise for example four nozzles distributed over the periphery of the lateral surface of the cutting head and oriented towards the inner wall of the first pipe, each of the nozzles being connected, by at least one conduit inside the cutting head, to said connector connected to said supply means.

The device advantageously comprises a device for measuring the thickness of the first pipe to be cut, disposed upstream of said nozzles and means for automatically adjusting the depth of cut provoked by said nozzles, as a function of the results of said measurement of thickness. Adjustment of the depth of cut may be obtained for example by varying the pressure of the fluid and/or the speed of displacement of the device.

It follows from the foregoing that the present invention enables pipes, particularly metal ones, to be replaced in situ, in situations for which it was impossible up to the present time to use the existing devices, particularly in the case of pipes having already been repaired and presenting excess thicknesses or additional welding beads.

Moreover, according to the present invention, the step of spreading and introducing the new tube may be effected well after the cutting step since the pipe is cut cleanly without creating small fragments, with the result that the cutting and casing means may be introduced separately in the pipe. It is thus possible to adopt a better work organization with a first team specialized in the work of cutting the existing pipes and a second team specialized in the work of laying new pipes, each team working at its own rhythm.

Finally, it should be noted that the cutting device according to the invention advances in regular manner without jerks, so that the equipment falls off in quality less quickly and no vibration or concussion disturbs the environment during the operations.

In the case of cutting metal pipes by projection of a non-homogeneous fluid, or of cutting by plasma which lends itself easily to an adjustment of the height of the flame, it is particularly advantageous to ensure an adjustment as a function of the thickness of the pipe to be cut, which allows a cutting operation which is both precise and without danger for the other pipes possibly laid underground near the pipe to be replaced.

BRIEF DESCRIPTION OF THE DRAWINGS

The invention will be more readily understood on reading the following description with reference to the accompanying drawings, in which:

FIG. 8 is a schematic overall view in elevation of a second embodiment of a pipe-replacing device according to the present invention.

FIG. 9A is a view in radial section of a pipe cut out entirely with the aid of a cutting head of a device according to the invention, such as the one of FIG. 8.

FIG. 9B is a view in radial section of a pipe cut partially with the aid of a cutting head of a device according to the invention, such as the one of FIG. 8.

FIGS. 10A and 10B show in front and side views an example of a cutting head usable in a device such as the one of FIG. 8.

FIG. 11 is a longitudinal section of an example of a nozzle for cutting with a jet of pure water usable in a cutting head according to the invention.

FIG. 12 is a longitudinal section of an example of a nozzle for cutting with an abrasive jet usable in a cutting head according to the invention.

DETAILED DESCRIPTION OF THE DRAWINGS

Figure 1:
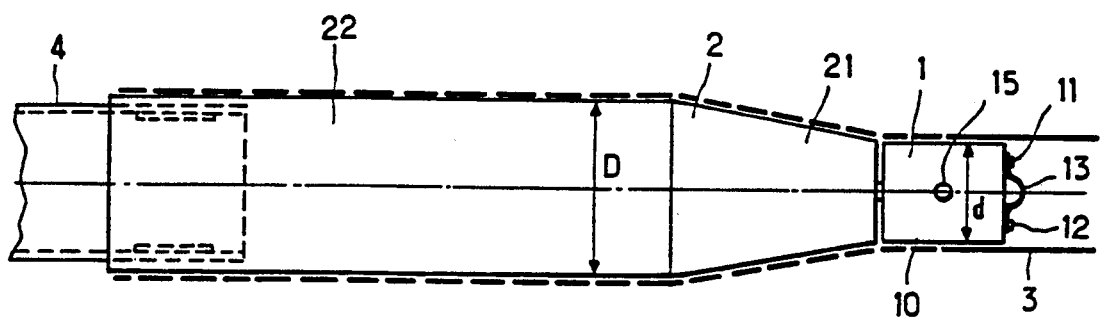
FIG. 1 is a schematic overall view in elevation of a first example of a pipe-replacing device according to the present invention.

Referring now to the drawings, FIG. 1 shows the device for replacing underground pipes according to the invention which is essentially constituted by cutting means 1 in the form of a cutting head 10 and a spreader device 2. The pipe 3 to be replaced which, in the majority of cases, is made of metal, is divided longitudinally into segments by the cutting head 10, in order, after the segments have been spread apart, to enable a new pipe 4 of diameter equal to or larger than that of the pipe 3 to be replaced, to be introduced in place of the old one, without it being necessary to remove the old pipe 3. The term "new pipe" is here understood to mean either the definitive pipe which replaces the original one and may be of a material different from the original pipe, or a sleeve in which the definitive pipe will be subsequently introduced.

Figure 1A:
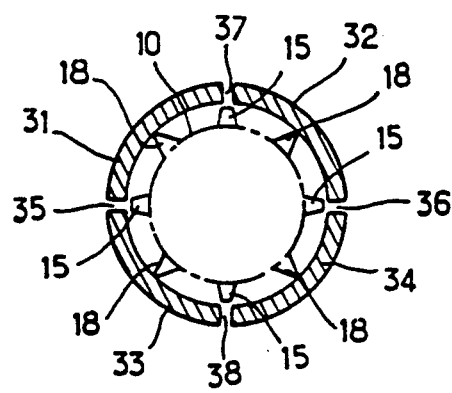
FIG. 1A is a view in radial section of a pipe cut with the aid of a cutting head of a device according to the invention, such as that of FIG. 1.

FIG. 1 shows a cutting head 10 introduced in the existing pipe 3 to effect longitudinal cuts thereof by a localized heating of the metal effected with the aid of nozzles 15 borne by the lateral surface of the cutting head 10, and directed towards the inner face of the wall of pipe 3, the localized heating being made to a temperature greater than or equal to the melting point of the metal of the wall of the existing pipe 3. The cutting head 10 is displaced inside the pipe 3, for example being towed by a cable fixed to a hook 13 placed on the front face of the cutting head 10. The nozzles 15 which may be constituted by two diametrically opposite nozzles and preferably three or four nozzles distributed over the periphery of the cutting head 10 on the cylindrical lateral face thereof, cut the pipe 3 longitudinally as the cutting head 10 advances inside pipe 3. FIG. 1A shows, in a cutting head 10, shown schematically in dotted lines, and comprising four nozzles 15 distributed as a cross and four positioning ribs 18 interposed between the nozzles on the periphery of the cutting head 10, the formation of four segments of pipe 31 to 34 separated from one another by longitudinal slots 35 to 38 formed with the aid of the nozzles 15.

The cutting head 10 may be used alone in a first step of simple division of the existing pipe into segments, without veritable fracturation or spreading of the segments formed, a spreader 2 being subsequently introduced into the split existing pipe, in a second step, in order to spread apart and, if necessary, further divide the segments of pipe 3, the new pipe 4 to be laid itself being fastened to the rear part of the spreader 2. However, as is shown in FIG. 1, the spreader 2 may be fixed directly to the rear of the cutting head 10 and may in that case comprise a substantially truncated front part 21 of which the smallest side substantially corresponds to the section of the cutting head 10 of diameter d and a cylindrical body 22 whose section presents a diameter D greater than the diameter of the new pipe 4 of which the front part may itself be fixed to the rear part of the body 22 of the spreader 2.

Figure 2A:
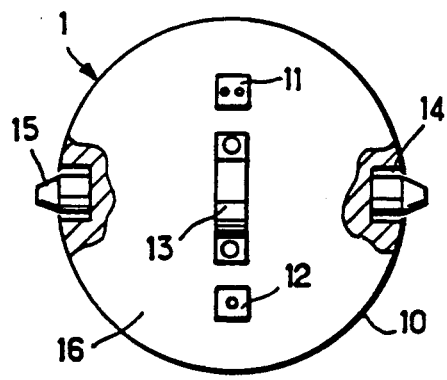
FIGS. 2A and 2B show in front and side views an example of a cutting head usable in a device such as that of FIG. 1.
Figure 2B:
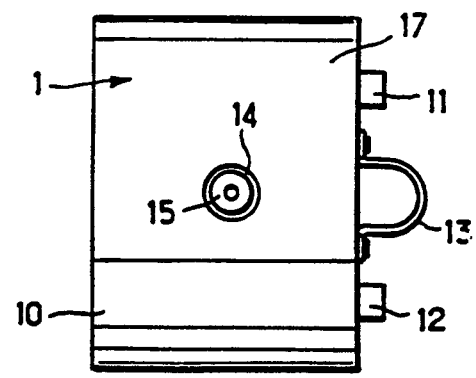

FIGS. 2A and 2B present a particular embodiment of a cutting head 10 according to the invention, more especially adapted for carrying out a process of cutting by plasma arc. On the front face 16 of the head 10 is located an electrical connector or terminal 11 to which may be connected an electrical supply cable and another connector 12 adapted to be connected to a flexible conduit for supplying compressed air. A hooking ring 13, to which a cable connected to a traction element may for example be fixed, is also mounted on the front face 16 of the head 10.

However, it will be noted that the connectors 11 and 12 may equally well be disposed on the rear face of the cutting head 10, the cable connected to connector 11 and the conduit connected to connector 12 in that case being introduced into pipe 3 through the opening located at the rear of the cutting head 10.

In the lateral face 17 of the head 10, two diametrically opposite recesses 14 each form a housing for a cutting nozzle 15 which projects radially slightly beyond the body 10 of the head itself.

The type of nozzle used depends on the process of cutting adopted.

Figure 3:
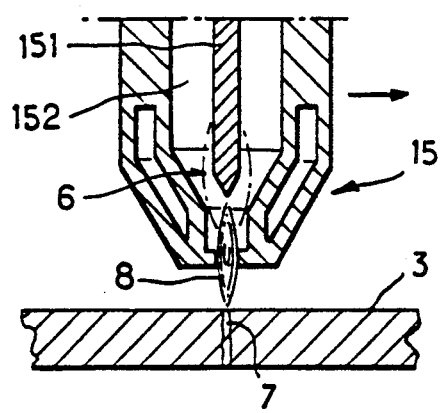
FIG. 3 is a longitudinal section of an example of a nozzle for cutting with a plasma flame usable in a cutting head according to the invention.

FIG. 3 shows in longitudinal section a nozzle used in the technique of cutting by plasma flame. This nozzle 15 presents a central electrode 151 supplied with electrical energy from terminal 11, and a conduit 152 which surrounds the electrode 151 and conducts air under pressure to the cutting zone 7. An electric arc 8 is created between the electrode 151 and the metal pipe 3 to be cut, which locally heats the metal beyond its melting point.

The compressed air 6 performs the role both of plasmagene gas and of fluid for cooling the nozzle 15 by evacuating the calories produced by the electric arc 8.

By way of examples, cuts were made with an air pressure of $6 \times 10^5$ Pa, an electric supply voltage of 220 volts and a current intensity of 36 amperes, on pipes having the following characteristics:

| Material | Outer diameter | Thickness |
| --- | --- | --- |
| Grey cast iron | 123 mm | 5.2 mm |
| Ductile cast iron | 118 mm | 4 mm |
| Steel | 114.3 mm | 3.6 mm |

In these particular cases, the cutting speeds obtained are of the order of 1 cm/s. One advantage of the technique of cutting by plasma thus described resides in that the height of the flame is easily adjustable and adaptable to the thickness and to the material to be cut. It suffices to dispose a device for measuring the thickness of the pipe 3 on the head 10 or just upstream thereof and to servo-control the parameters of adjustment of the height of the flame and therefore depth of cut, by the thickness measured. The device for measuring the thickness of the pipe wall may for example be an ultrasound device. Automatic adjustment of the depth of cut guarantees that the pipes possibly laid underground in the vicinity of pipe 3 will themselves not suffer any damage.

Figure 4B:
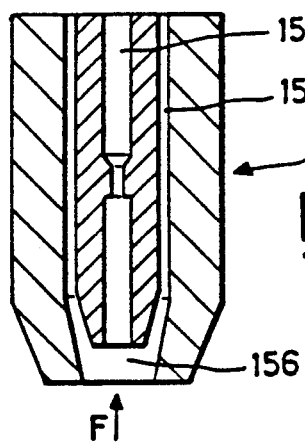
FIGS. 4A and 4B are views, in front view and in longitudinal section respectively, of an example of an oxygen-cutting nozzle usable in a cutting head according to the invention.
Figure 4A:
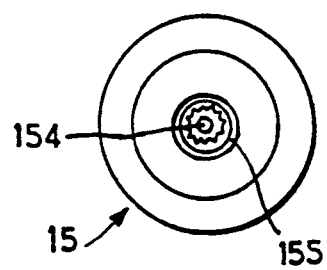

According to another possible embodiment, the technique of oxygen-cutting is used for cutting. In that case, a nozzle 15 such as the one shown in FIGS. 4A and 4B may be used. This nozzle 15 is constituted by two coaxial tubular elements defining two gas supply conduits. One of conduits, 154, which may be disposed at the centre of the nozzle 15, is intended to supply a combustible gas such as acetylene, whilst the second conduit 155 which may be annular, serves for the supply of oxygen. These two conduits 154, 155 open out in a combustion zone 156 located at the end of the nozzle 15. An additional gas admission conductor must, of course, be provided on the cutting head 10, for example on the front face 16 to be connected to a flexible combustible gas supply conduit.

The following numerical examples show in non-limiting manner possibilities of employing the technique of oxygen-cutting. With oxygen under a pressure of $10^5$Pa and acetylene under a pressure of $10^4$Pa, pipes having the following characteristics were able to be cut into segments at cutting speeds of about 0.1 cm/s.

| Material | Outer diameter | Thickness |
| --- | --- | --- |
| Grey cast iron | 123 mm | 5.2 |
| Ductile cast iron | 118 mm | 4 |
| Steel | 114.3 mm | 3.6 |
| Steel coated with polyethylene | 114.3 mm | 5.6 |

It is seen in particular that the cutting process is applied equally well to ductile cast irons and to brittle cast irons and that variations in constitution of the same pipe, for example due to separate sections, do not hinder normal running of the cutting process.

The cutting head 10 may also be adapted to employ a technique for cutting with the aid of a laser beam. In that case, the nozzles 15 do not serve to supply gaseous currents with the creation of arcs or flames, but serve simply to orient a laser beam created by a laser generator incorporated in the cutting head 10 or disposed in the vicinity thereof, towards the wall of the pipe 3 to be cut and divided into segments, to allow subsequent spreading of the segments. The use of a technique of laser cutting leads to a result similar to that obtained by the other processes already described and thus enables a pipe 3 to be cut for example in the manner shown in FIG. 1A. However, cutting with a laser beam is preferably used for a pipe 3 whose wall thickness does not exceed about 6 mm.

It is also possible to implement techniques of fusion drilling, which allow rapid advances even for walls of considerable thickness, or a process of cutting with a torch employing powdered iron which enables a stronger combustion to be obtained than with a simple torch.

FIG. 8 shows a cutting head 10 introduced in the existing pipe 3 which is very similar to the cutting head 10 of FIG. 1, but is intended to effect longitudinal cuts in this pipe by a localized projection of a pressurized fluid produced with the aid of nozzles 115 borne by the lateral surface of the cutting head 10, and directed towards the inner face of the wall of the pipe 3. As in the case of FIG. 1, the cutting head 10 is displaced inside the pipe 3 for example by being towed by a cable fixed to a hook 13 placed on the front face of the cutting head 10. The nozzles 115, which may be constituted by two diametrically opposite nozzles or preferably three or four nozzles distributed over the periphery of the cutting head 10 on the cylindrical lateral face thereof, cut the pipe 3 longitudinally as the cutting head 10 advances inside pipe 3. FIG. 9A shows, in the case of a cutting head 10 shown schematically in dotted lines, and comprising four nozzles 115 arranged as a cross and four positioning ribs 15 interposed between the nozzles on the periphery of the cutting head 10, the formation of four segments of pipe 31 to 34 separated from one another by longitudinal slots 35 to 38 formed by the nozzles 115. As in the case of the embodiments described hereinabove, the cut thus obtained may either affect the whole thickness of the pipe 3 (FIG. 9A), or may affect only a part of the thickness of pipe 3 (FIG. 9B). In the latter case, the partial cut localizes the break which will be created by the spreader 2 and totally cancels the risk of damaging an adjacent pipe by the fluid under pressure. In the case of a partial cut, the longitudinal slots 35 to 38 define grooves of which the bottoms 135 to 138 constitute connecting elements of small thickness which may easily be broken during the subsequent passage of a spreader means inside the pipe (FIG. 9B).

FIGS. 10A and 10B show a particular embodiment of a cutting head 10 according to the invention. On the front face 16 of the head 10 is located a connector 111 adapted to be connected to a flexible fluid supply conduit. A hooking ring 13 to which a cable connected to a traction element may for example be fixed, is also mounted on the front face 16 of the head 10.

However, it will be noted that the connector 111 may equally well be disposed on the rear face of the cutting head 10, the conduit connected to the connector 111 in that case being introduced in pipe 3 through the opening located at the rear of the cutting head 10.

In the lateral face 17 of the head 10, two diametrically opposite recesses 114 each form a housing for a cutting nozzle 115 which projects radially slightly beyond the body 10 of the head itself.

The type of nozzle used depends on the process of cutting adopted (pressure and nature of the fluid, diameter of the jet of fluid, . . . ).

FIG. 11 shows in longitudinal section a nozzle used in the technique of cutting with pure water under pressure. This nozzle 115 presents a conduit 141 which supplies pure water (filtered water) under pressure to the cutting zone 7. A jet of water 108 is created between the nozzle 115 and the pipe 3, which locally cuts said pipe.

The pressurized water 108 performs the role both of cutting agent and of cleaning fluid by evacuating the particles produced by the pipe being cut.

In order to be adapted to the material to be cut, the pressure of the water may attain 4000 bars, whilst the diameter of the jet is generally included between 0.1 mm and 0.5 mm.

By way of examples, cuts were made on pipes of plastics material (polyethylene) with pure water under pressure in the following configurations:

| Thickness | Speed of cut |
| --- | --- |
| 3 mm | 3 m/min |
| 10 mm | 1 m/min |

According to another embodiment of the invention, a mixture of water and of abrasive particles may be used as cutting means. In that case, a nozzle as shown in FIG. 12 may be used; the pure water under pressure is supplied in the form of a jet 108 to a small mixing vessel 142 located at the outlet of the water conduit 141. Another conduit 143 supplies abrasive particles 109 likewise to the mixing vessel 142. The high speed of the water jet 108 creates a vacuum in the mixing vessel 142. The abrasive particles 109 conducted into vessel 142 thanks to the vacuum thus created, mix with the jet of water 108, thus forming an abrasive jet 110. The abrasive jet 110, created between the nozzle 115 and the pipe 3, locally cuts the pipe.

An additional conduit 144 may advantageously be provided at the outlet of the mixing vessel 142, in order to render the jet more directional.

According to this embodiment, the pressure of the water may attain 3000 bars and the diameter of the abrasive jet is generally included between 0.8 and 2.0 mm.

The following numerical examples show in non-limiting manner the characteristics of the cuts obtained thanks to the particular embodiment of the invention using a mixture of water and of abrasive particles.

| Material | Thickness | Speed of cut |
| --- | --- | --- |
| Plastics material (polyethylene) | 15 mm | 1 m/min |
| Steel | 5 mm | 0.24 m/min |
| | 10 mm | 0.12 m/min |
| Cast iron | 5 mm | 0.6 m/min |
| Aluminium | 5 mm | 0.6 m/min |
| | 10 mm | 0.3 m/min |
| Fiber-reinforced plastic | 6 mm | 0.5 m/min |
| Lead | 5 mm | 2.4 m/min |

As is apparent in FIGS. 1 and 8, the cutting head 1 may be connected by any connecting means known per se to a spreader means 2 intended to spread apart the pipe 3 once the latter has been divided into segments.

FIGS. 5A to 5D show different possible shapes of the spreader 2 whose function is always to increase the section of the pipe 3 from an initial diameter d to a final diameter D.

Figure 5A:
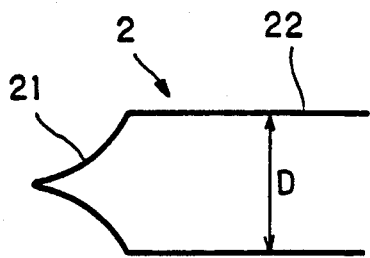
FIGS. 5A to 5D are schematic side views showing four profiles of a spreader usable in a device according to the invention.
Figure 5B:
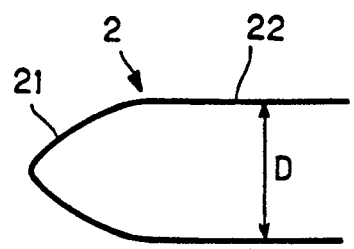
Figure 5C:
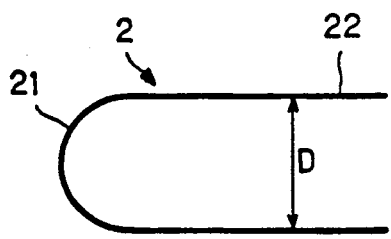
Figure 5D:
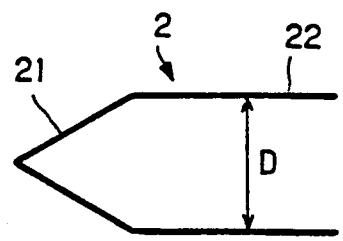

FIG. 5A shows a spreader 2 presenting a substantially conical tip 21, but with a concavity facing towards the inside. The spreader 2 of FIG. 5B presents a likewise substantially conical tip 21 but with a convexity facing the outside. In FIG. 5C, the spreader 2 presents a rounded front end 21. Finally, in FIG. 5D, the spreader 2 presents a truly conical tip 21.

The spreader 2 of FIGS. 5A to 5D may be used in combination with the cutting head 10, being disposed at a predetermined distance therebehind, or may be used in a second step, being for example towed or pushed inside the pipe 3 already divided into segments, independently of the advance of the cutting head 10.

The rear extension 22 of the spreader 2 is in any case essentially cylindrical, of diameter D. On this extension 22 is fixed, by any known means, either the definitive replacement pipe 4 which will convey the fluid or gas to be transported, or a protection sleeve inside which the definitive pipe will be placed in position.

Figure 6:
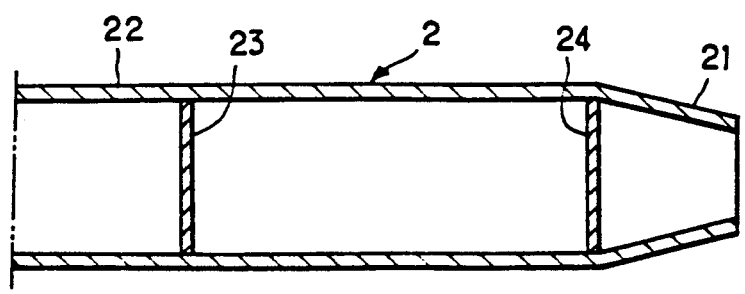
FIG. 6 is a view in longitudinal section of a particular example of a spreader.

FIG. 6 shows an example of a tubular spreader 2 provided with radial struts 23, 24 adapted to reinforce the structure of the spreader 2. If the spreader 2 is attached directly to the rear of the cutting head 10, as in the device of FIGS. 1 and 8, and if the connectors 11, 12 or 111 for connection to sources of energy or fluid are disposed on the rear face of the cutting head 10, the struts 23, 24 are of course provided with the necessary openings to allow passage of the cables or flexible conduits introduced through the rear of the spreader 2.

Figure 7:
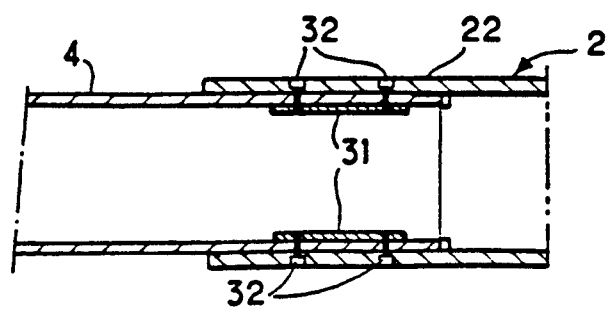
FIG. 7 is a view in longitudinal section of an example of means for fastening a new pipe to the rear of a spreader device.

FIG. 7 shows an example of a device for attaching a new pipe 4 to the rear end of the cylindrical part 22 of the spreader 2. Connecting means such as screws, threaded rods or bolts 32 whose head is countersunk in the wall of the spreader 2, pass through the wall of the front end of the new pipe 4 and are engaged by their end in retaining elements 31 such as nuts or small bars provided with tapped holes, disposed inside the front end of the new pipe 4.

A process according to the invention for replacing an underground pipe by a pipe of diameter greater than or equal to the original pipe, will now be generally described.

The first step consists in introducing inside the existing pipe 3 at least one cutting head such as the cutting head 10 described hereinabove. This cutting head 10 may be towed by any means known per se, such as for example by a device as described in document FR-B-2 552 346 relating to an apparatus for independent advancing displacement inside a pipe, but the head 10 may also be driven by a cable from traction means located outside the pipe 3. The cutting operation takes place simultaneously to the advance of the head 10 in the pipe 3, thanks to the nozzles 115 described hereinabove. When two cutting nozzles are used, their translation parallel to the axis of the pipe is sufficient to ensure cutting into two half-shells. This first step may for example be carried out by a first team, then a second team may, some time later, carry out the second step which consists in spreading apart the fragments of the original pipe cut partially or totally. In fact, cutting by projection, which avoids the occurrence of vibrations, enables the whole pipe to be conserved after total or partial cut thereof. The pipe 3 divided longitudinally into segments which do not fragment may remain several hours, and even some days, without risk of being obstructed by fragments.

The cuts are, of course, not necessarily strictly longitudinal and if the cutting head 10 presents a certain movement of rotation, the cuts may be helicoidal without the subsequent operations being modified.

The second step consists in displacing the spreader 2 inside the fragmented pipe in order to increase the section of passage and to introduce either the definitive pipe 4 or a sleeve 4 in which the definitive pipe will be subsequently inserted. Of course, the spreading apart of the old pipe and the introduction of the new pipe are two simultaneous operations as the new pipe is fixed to the rear extension 22 of the spreader 2. Any tractor vehicle or robot may be suitable for towing the spreader 2 and the replacement pipe. If it is judged that the power of the tractor vehicle is not sufficient, a second means of displacement may be provided in order to push the spreader and replacement pipe.

This second means may also be used in the case of the steps of cutting, spreading and introducing a new pipe being carried out in one pass.

As already indicated, the device according to the invention may advantageously be provided with an element for measuring the thickness of the existing pipe, for example constituted by an ultrasound system, which transmits this measurement to a decision element which itself enables the depth of the cut to be automatically adjusted as a function of the thickness to be cut.

The process according to the invention, of which an essential characteristic resides in that the old pipe is cut by the localized action of a flow of particles, matter or radiation, is particularly flexible in its implementation and in particular easily enables a partial cut to be made without it being necessary to make delicate adjustments. In fact, a partial cut may be obtained simply by increasing the speed of displacement of the cutting nozzle with respect to the surface to be cut. In that case, the nozzle does not remain at a given spot for a sufficiently long time to cut the whole thickness of the pipe.

As indicated hereinabove, the flows of particles, matter or radiation may be diverse.

For example, cutting by plasma employs a flow of gaseous matter (the plasmagene gas which may be air) and a flow of particles (the displacement of the electrons which create the localized heating under the action of a difference in electrical potential between the cutting nozzle and the pipe being translated by an electric arc).

Oxygen-cutting employs two flows of gaseous matter (oxygen and combustible gas).

The projection of a jet of pure water under pressure employs a flow of liquid matter (water to which an additive is possibly added to render the jet more coherent).

The projection of a jet of abrasive water under pressure employs a flow of liquid matter (water) and a flow of abrasive particles (powder of inorganic origin, for example).

The projection of a laser ray employs a flow of radiation translated by a wave associated with a flow of particles (photons) taking into account the undulatory and copuscular duality of the light.

In practice, the process of localized cutting by plasma arc is particularly well adapted to metal pipes.

The process of localized cutting by the projection of a jet of pure water under pressure is well adapted to pipes made of plastics material, such as for example polyethylene or polyvinyl chloride.

The process of localized cutting by the projection of a jet of abrasive water under pressure is well adapted to metal or inorganic pipes.

What is claimed is:

1. A process for replacing a first underground pipe with a second pipe whose mean diameter is substantially equal to that of said first pipe, comprising the steps of:

provivding cutting means for displacement inside the first pipe, said cutting means including localized projection means for localized projection of a flow of matter; and cutting said first pipe over at least a part of its thickness, using the localized projection of the flow of matter onto said first pipe, with the localized projection means which are displaced inside the first pipe, in order to longitudinally divide said first pipe into at least two cut segments.

2. The process of claim 1, further comprising the step of:

spreading apart said cut segments of said first pipe with spreader means which are displaced inside the first pipe in order to allow an introduction of said second pipe which is intended to replace said first pipe.

3. The process of claim 2, wherein the cut segments of the first pipe are spread apart immediately after cutting by the localized projection, and by making the projection means and the spreader means advance simultaneously with each other inside the first pipe.

4. The process of claim 2, wherein cutting of the first pipe by the localized projection is effected in the course of a first period of time during which the localized projection means are made to advance inside the first pipe, and the cut segments of said first pipe are spread apart during a subsequent period of time for positioning the second pipe, the cut segments being spread apart with the aid of said spreader means introduced separately in the first pipe after said localized projection means and advancing inside the cut first pipe independently of said localized projection means.

5. The process of claim 2, wherein a protection sleeve having a head which is towed behind said spreader means is inserted into said cut and spread apart first pipe and then said said pipe is introduced inside said sleeve to be placed in position.

6. The process of claim 2, wherein said second pipe has a head which is towed behind said spreader means and is inserted directly into said cut and spread apart first pipe to be placed in position.

7. The process of claim 1, wherein the localized projection which cuts said first pipe is produced by a directional jet of water under pressure.

8. The process of claim 1, wherein the localized projection which cuts said first pipe is produced by a directional jet constituted by a mixture of water and of abrasive particles under pressure.

9. The process of claim 1, wherein the localized projection which cuts said first pipe is produced by a flow of gaseous oxygen and a flow of gaseous fuel burned with the oxygen by said cutting means.

10. The process of claim 9, wherein the gaseous fuel is acetylene.

11. The process of claim 1, wherein the localized projection which cuts said pipe is produced by a flow of gaseous matter and a flow of electrons supplied by plasma arc means forming said cutting means.

12. The process of claim 1, wherein the localized projection which cuts said first pipe is produced by a radiation of coherent light supplied by laser beam means forming said cutting means.

13. The process of claim 1, wherein the localized projection which cuts said first pipe is produced by fusion drilling means forming said cutting means.

14. The process of claim 1, wherein the localized projection which cuts said first pipe is produced by a flow of gaseous matter and of particles supplied by powdered iron torch means forming said cutting means.

15. The process of claim 1, wherein the localized projection on the first pipe is produced so as to cut only through a part of thickness of the first pipe, so as to maintain between the cut segments of the first pipe connecting elements of small thickness which may be easily broken during the subsequent passage of a spreader means inside said pipe.

16. The process of claim 1, wherein the localized projection onto the first pipe is produced so as to cut the thickness of the first pipe.

17. The process of claim 15, wherein the thickness of the pipe to be cut is measured by measuring means which cooperate with adjusting means for automatically adjusting a depth of the cut.

* * * * *